(No Model.) 2 Sheets—Sheet 1.

A. C. ESTABROOK.
DEVICE FOR WORKING PLASTIC MATERIAL.

No. 590,539. Patented Sept. 21, 1897.

Witnesses:
Arthur T. Randall
Geo. B. Whiting

Inventor:
Alanson C. Estabrook,
By MacLeod Calver & Randall
his Attorneys

THE NORRIS PETERS CO., PHOTO-LITHO., WASHINGTON, D. C.

(No Model.) 2 Sheets—Sheet 2.
A. C. ESTABROOK.
DEVICE FOR WORKING PLASTIC MATERIAL.
No. 590,539. Patented Sept. 21, 1897.
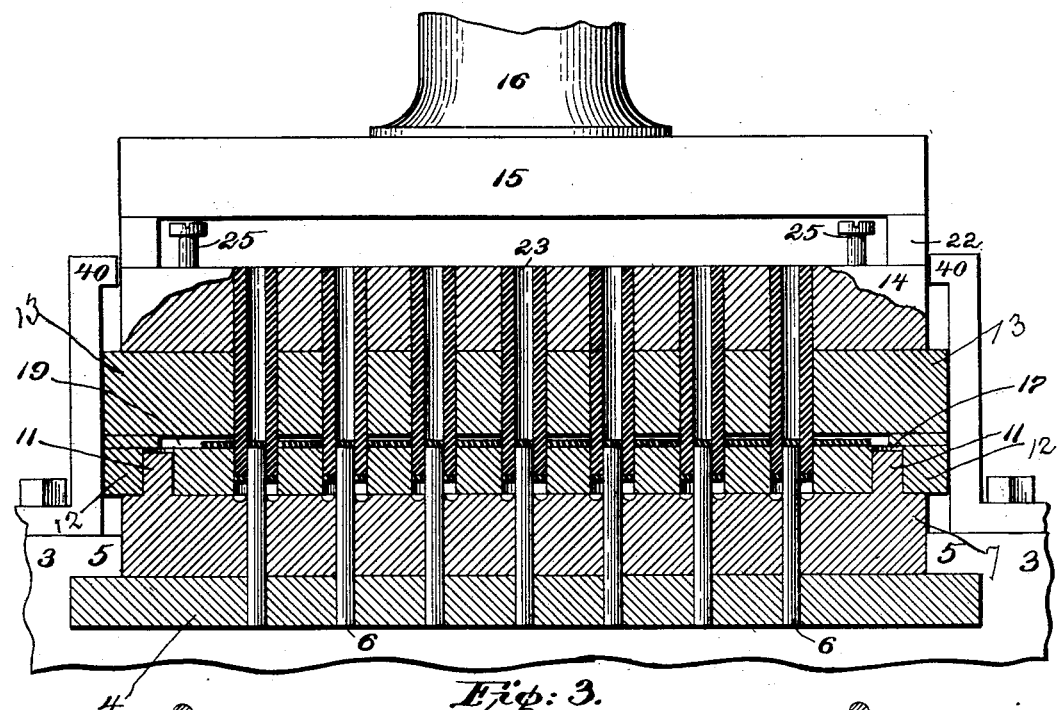
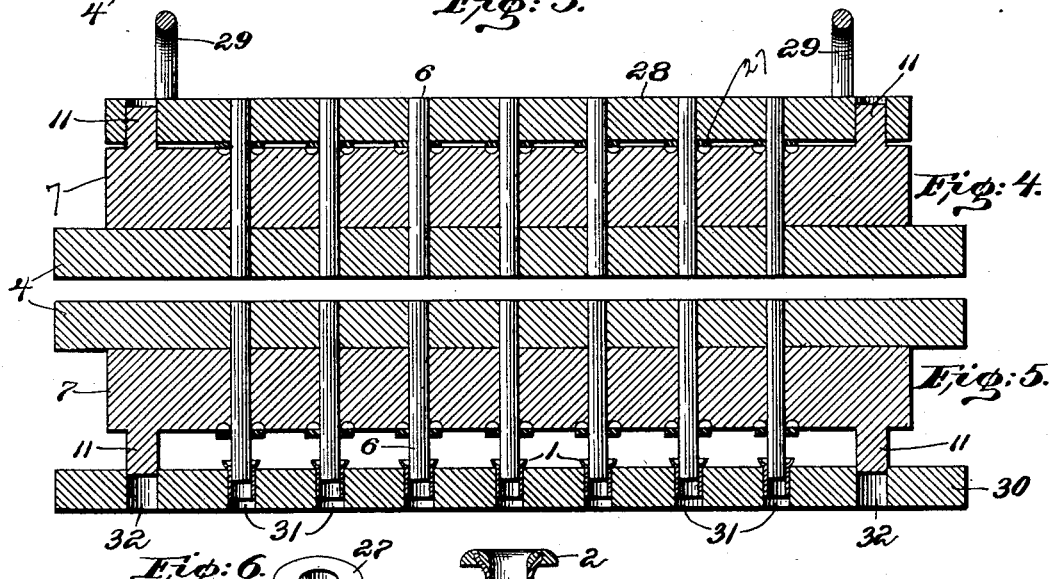
Witnesses:
Inventor:
Alanson C. Estabrook
By Macleod Calver & Randall
his Attorneys

UNITED STATES PATENT OFFICE.

ALANSON C. ESTABROOK, OF NORTHAMPTON, MASSACHUSETTS.

DEVICE FOR WORKING PLASTIC MATERIAL.

SPECIFICATION forming part of Letters Patent No. 590,539, dated September 21, 1897.

Application filed July 13, 1895. Serial No. 555,865. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Working Plastic Material, of which the following is a specification, reference being had therein to the accompanying drawings.

In some cases eyelets, such as are used on boots and shoes and in other connections, have the ends thereof which are exposed when in use covered with plastic material, which latter is molded thereon and constitutes a head or finish therefor.

My invention relates chiefly to the manufacture of such eyelets, but, as will be obvious from what follows herein, it is more or less applicable in the manufacture of other articles which are composed in whole or in part of molded plastic material.

My invention consists in certain improved mechanism for working plastic material in the production of articles such as aforesaid, all as hereinafter fully indicated in the following description, with reference to the accompanying drawings, and as is afterward more particularly pointed out and distinctly defined in the claims at the close of this specification.

Figure 1:
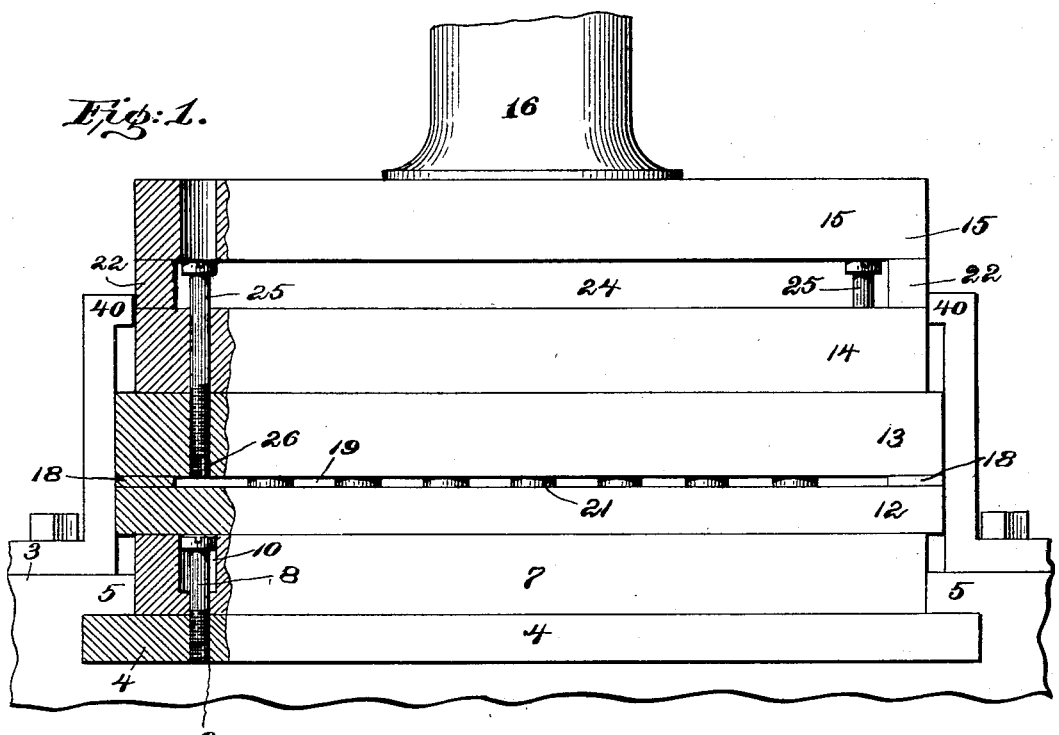
Figure 2:
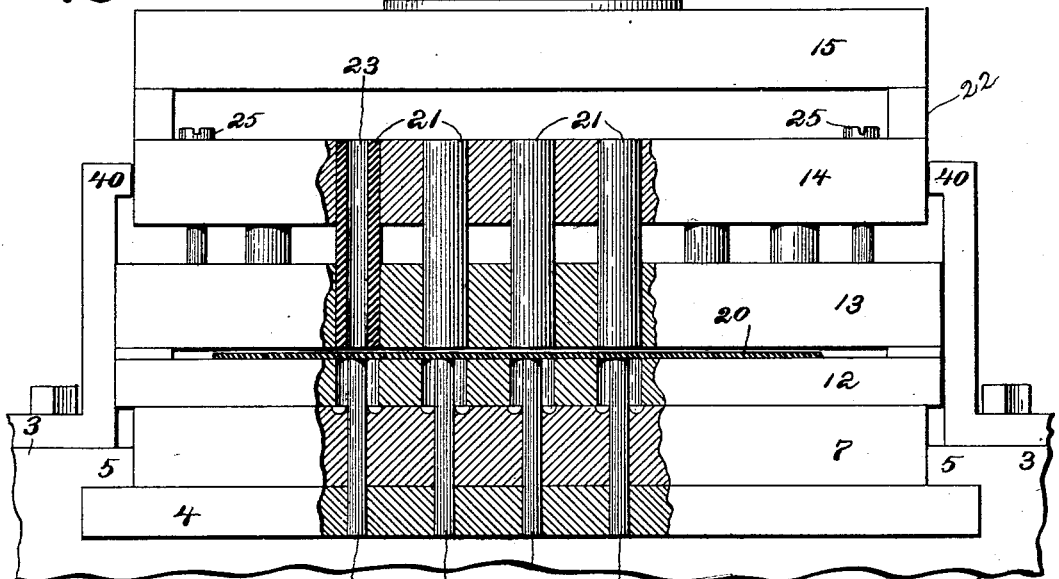

In the accompanying drawings, Figure 1 is a view mainly in side elevation, but partly broken away to show the internal structure, of certain devices which are employed by me in the punching out of portions of plastic material from a sheet, the punch-carrying plate and punches being in their lowest position. Fig. 2 is a similar view of the said devices, but with the break made at a different place and showing the punch-plate and punches raised into their highest position with a sheet of plastic material inserted beneath the lower ends of the punches. Fig. 3 is a view like unto Fig. 2, but with the break extended somewhat and showing the parts in the position in which they are represented in Fig. 1 and representing the completion of the punching operation. Fig. 4 is a view showing in transverse section the die-plate and the pin-carrying plate with its pins both removed from the punching apparatus of Figs. 1, 2, and 3 and having applied thereto the heater-plate, which is described hereinafter. Fig. 5 is a view in similar section of the said die-plate, this view representing the said parts brought together in the operation of closing the die plates or molds together and applying the coverings of plastic material to the ends of the eyelets. Fig. 6 shows, one above the other, an eyelet and the flat ring or washer of plastic material which is to be applied thereto to form its covering. Fig. 7 shows in transverse section an eyelet having applied thereto and molded into shape the head or covering, which is described hereinafter.

Having reference to Fig. 7, 1 designates an eyelet, which, as usual, is of cylindrical form and has one end thereof enlarged. 2 is a head or covering of plastic material, which is molded upon the said enlarged end of the eyelet.

Heretofore in the molding of small articles in general and also in the molding of heads or coverings upon eyelets, as in Fig. 7, it has been customary to first form the plastic material into sheets and then to place either the said sheets or strips cut therefrom between the halves of the molds which are employed, such halves having previously been heated, or the sheet or strips themselves having first been heated upon a steam-table, and the said molds being furnished with sharp cutting edges around the peripheries of the cavities which determine the shape of the articles produced or of the heads aforesaid, so as to cut out the articles or the rings of which such heads are formed from the sheet or strip. There are various objections to proceeding in this manner. One objection is the extreme heating of the molds. Another is that the dies or molds heretofore used have required to be located sufficiently far apart in the plates in which they are formed to provide room for waste material between the adjacent dies or molds, and hence, as will be apparent, a considerable proportion of the sheet or strip employed becomes scrap material and is not utilized in the production of the article. This scrap material is injured and lessened in value by the heating to which the entire sheet or strip is subjected.

As is well known to all users of plastic material, such as celluloid, every time the same is heated it loses plasticity and becomes hard, so that in subsequently reworking and forming it into sheets fresh and costly material must be added in order to bring it into proper condition for use. The forcing of the cutting edges of the molds through the sheets or strips of material, or, in other words, the severing of portions of the sheet or strip therefrom by the molds, consumes considerable power. Articles produced by the molds just described when taken from the molds are marked by a projecting portion or flash which indicates the meeting line of the dies or molds and requires to be removed by subsequent treatment or finishing operations.

In the usual method of molding it is necessary to heat the molds themselves quite hot, inasmuch as the material has to "flow," as it is termed, quite considerably in order to take the shape of the molds, and must for this reason be made soft in order that it may flow with sufficient freedom and avoid the formation of a thick flash. The molds which are required to be employed in the foregoing method, in consequence of being provided with cutting edges, as aforesaid, must necessarily be hardened to enable them to keep their shape. Such molds are very difficult and expensive to make, inasmuch as the steel is liable to spring out of shape while being heated, and if it does so the dies or molds will not come together as perfectly as they must in order to do their work properly. The edges of the dies or molds, moreover, frequently are jammed and injured by the overflow which takes place from the shaped cavity in which the molding is performed, this overflow getting between the said edges of the molds and being jammed by the heavy pressure into the steel.

My invention has been devised by me with the aim in view of obviating the foregoing objections. The special ends sought to be secured by me are, in part, to avoid having to heat the material which is not utilized in the formation of the article, to dispense with making cutting edges on the molds themselves, to dispense with the extreme heating of the molds themselves, to effect an economy in the use of the plastic material, and to provide a novel and improved manner for introducing the plastic material into molds or dies and for applying it to the eyelets.

I have shown in the accompanying drawings the best means which I have yet contrived for carrying my invention into effect. In said drawings I have shown only such parts as are essential to an understanding of the nature and working of my invention.

At 3, Figs. 1, 2, and 3, is shown part of the fixed framework of a punching-machine, and at 4 is a plate which is removably applied to the said framework 3, it being held from moving upwardly by lips or projections 5 on the said framework, beneath which lips or projections the edges of the said plate 4 are passed in the operation of applying the plate to the framework. This plate carries a series of pins 6, projecting from the upper side thereof, as shown. When the plate in question is applied to the framework 3, the projecting portions of the pins 6 extend upwardly above the plate. With the plate 4 is connected a second plate 7, which latter is perforated and receives in the perforations thereof the projecting portions of the pins 6, the thickness of the plate 7 being less than the length of the projecting portions of the pins, so that in the position in which the parts are shown in Figs. 2 and 3 of the drawings the upper ends of the pins stand above the top surface of the plate 7. The plate 7 constitutes one of the die-plates or mold-plates, as will be described hereinafter, and is formed around each of the holes which are made therein for the passage of the pins 6 with a shaped cavity or depression suitable for molding the head or covering 2, which in Fig. 7 is shown applied to the eyelet 1. The plates 4 and 7 are united by devices which permit movement of the same relative to each other to a limited extent. This movement is designed to enable the plate 7 to be raised to the free ends of the pins 6 when required. I have herein shown in Fig. 1 the connection of the plates 4 and 7 as effected by means of screws 8, the stems of which latter pass downwardly through holes that are provided therefor in the plate 7 and enter threaded holes 9 in the plate 4. Depressions 10 beneath the heads of the said screws in the plate 7 allow the said plate 7 to be raised and lowered on the stems of the latter, contact of the undersides of the said heads with the bottoms of the depressions 10 arresting the movement of the plate 7 and thereby preventing the plates from becoming disconnected from each other.

11 11, Figs. 3, 4, and 5, are steady-pins projecting from the outer surface of the plate 7.

12, 13, 14, and 15 are plates pertaining to the punching-head of a punching-machine, the said plates being connected together and being operated from suitable actuating mechanism, 16 being intended to represent the lower end of a post which is in connection with the actuating devices. After the application of the plates 4 and 7 to the framework 3 the descent of the assemblage of plates 12 13, &c., causes the plate 12 to rest upon the upper surface of the plate 7, as indicated in Figs. 1, 2, and 3, the proper position of the said plate 12 with reference to the said plate 7 being secured by means of the steady-pins 11 entering holes 17, which are formed for the reception of the said steady-pins in the plate 12. The said plate 12 constitutes the lower punching-plate and is formed with a series of holes therethrough which are arranged so as to be concentric with the pins 6 after the plate 12 has been brought down against plate 7, as aforesaid. Plates 12 and 13 are united firmly to each other, they being separated sufficiently by spacing-pieces 18 18 or the like means to leave between them an opening or space 19, which is sufficient to permit of the introduction of a sheet 20 of the plastic material which is to be molded. The plate 13 constitutes a guide-plate for the punches 21, which latter are secured to the punch-carrying plate 14, as shown most clearly in Figs. 2 and 3, and pass through holes in the guide-plate 13.

The punch-carrying plate 14 is connected firmly with the top-plate 15, the two being separated from each other by spacing-pieces 22. The pair of plates 14 and 15 is connected with the pair of plates 12 and 13 by devices which permit, in the upward movement of the parts, the pair 12 and 13 to be arrested by the stops 40 40, which are applied to a fixed part of the framework, while the upward movement of the pair 14 and 15 continues for a short distance, and afterward in the descent of the parts the said connecting devices permit the pair 14 and 15, together with the punches carried by the plate 14, to continue their descent for a short period of time after the pair 12 and 13 have become stationary in consequence of the plate 12 coming in contact with the top surface of the plate 7. This relative movement, as will be obvious, enables in the ascent of the parts the lower ends of the punches 21 to be raised above the space 19 for the admission of the sheet 20 of plastic material and in the descent of the parts enables the punch-plate 12 first to be applied to the plate 7 with the openings therein registering properly with the shaped cavities or depressions aforesaid and then permits the punches 21 to be carried downward through the said punch-plate 12 and through the sheet of plastic material resting thereon in the space 19. In the said operation the punches carry the portions of material which are punched out from the sheet 20 down into the openings in the plate 12, as indicated in Fig. 3.

The punches 21 are hollow, and the inner edges at the lower ends thereof are made with cutting edges which coact with the upper ends of the pins 6, so that as the punches 21 descend and act to sever disks or other shaped portions of material from the sheet 20 the pins 6 also operate to punch out the centers of the said disks or pieces, forming thereby rings or washers such as that which is shown at 27 in Fig. 6. The central portions that are punched out from the disks in question pass upwardly through the central openings 23 of the punches, finally escaping into the space 24 between the plates 14 and 15, from which space they may be removed when necessary. A convenient means of connecting the upper pair of plates 14 and 15 with the lower pair of plates 12 and 13, so as to permit the desired movement of the one pair relatively to the other, as aforesaid, is shown in Fig. 1, in which screws 25 25 pass freely through holes that are made in the plate 14, their threaded stems entering threaded holes 26, that are formed in the plate 13. The movement of the parts relatively to each other is terminated by the engagement of the heads of the screws 25 25 with the plate 14 after the parts have separated to the desired extent.

By the descent of the punches the rings or washers 27, which are produced in the manner described, are carried down upon the pins 6 and are left thereon in the positions indicated in Fig. 3. The raising of the punching devices lifts the plate 12 off the pins 11 and leaves the plates 4 and 7 free to be removed from the framework 3. After such removal the said plates 4 and 7 are placed upon a suitable steam-table or other support to be heated. I now apply to the said parts a heater-plate 28, which during the performance of the foregoing operations has been resting upon a steam-heated table or other heating device and thereby has been brought to the proper temperature. This heater-plate is perforated, as indicated in Fig. 4, to fit upon the projecting ends of the pins 6 and the steady-pins 11, which last cause its holes to register properly with the said pins. The said plate carries the rings or washers 27 downward on the pins 6, as indicated in Fig. 4, and through resting with its weight thereon softens the same, thereby preparing them for the molding operation which follows.

29 29, Fig. 4, are handles or bails, which may be provided, if desired, to facilitate the handling of the plate 28. The plate 28 having been left upon the pins 6 for a sufficient length of time to effect proper softening of the rings or washers 27 it then is removed, and the plates 4 and 7 next are inverted and applied to the plate 30 in the manner indicated in Fig. 5. The said plate 30 constitutes the other die-plate or mold-plate, it coöperating with the plate 7 in forming the heads or coverings 2 of Fig. 7. Prior to applying the plates 4 and 7 to the said plate 30 the latter has introduced into the holes 31 31, which are formed therein, the eyelets 1 1, to which the heads or coverings 2 are to be applied. The said plate 30 has holes 32 32 therein to receive the steady-pins 11 11, which, as above described, are provided on the plate 7. This insures the proper registering of the pins 6 with the holes 31, containing the eyelets 1. The plates 7 and 30 now are forced closely together, thereby compressing the softened rings or washers 27 onto the enlarged ends of the eyelets 1 and causing the said rings or washers to be molded into the final shape of the heads 2.

The characteristics of my invention are as follows: The material of which the heads 2 are formed is shaped to the exact size which is required for the production of the said heads by the punching devices prior to the placing together of the dies or molds which give the shape to the heads, thereby obviating all cutting of the stock between the edges of the dies or molds. Less power than heretofore is required for effecting the compressing or molding operation. There is no overflow of the material between the edges of the molds to occasion injury to the latter. The sheet of stock from which the rings or washers are cut or punched can be much more completely utilized than with prior methods of production, and inasmuch as the scrap is not heated to soften the same it is not injured and lessened in value. I mold the heads without the usual flash or line around the edge thereof, thus effecting a saving of the expense heretofore involved in the finishing of the work.

The pins 6, which pass through the holes in the die-plate or mold-plate 7, as aforesaid, serve to center the rings or washers 27 with exactness in the shaped cavities or depressions that are formed in the said die-plate or mold-plate 7, and in consequence of causing the rings or washers 27 to remain upon the said pins 6 after they have been punched from the sheet of stock in the manner above described I avoid the further handling of the said rings or washers which would otherwise be required for placing the said rings or washers in the dies or molds.

The dies or molds which I employ do not need to be hardened, as heretofore. Inasmuch as there is no overflow of the material from within the same there consequently is no danger of their becoming jammed and injured on their edges, the pressure being altogether inside the molds. The application of the heater-plate 28 in the manner above described softens the plastic material of which the rings or washers are composed very much quicker and makes such material much more plastic than is the case when a sheet of plastic material is simply laid upon a heated die. In the latter case the contact between the sheet of material and the heated die is less perfect than it is between the rings or washers and the heated plate resting thereon. When the heater-plate 28 is used as just described, the weight of the plate itself secures greater efficiency. I have already described the plates 4 and 7 as being connected together in a manner which permits movement of the one relatively to the other. The object of this is to effect the stripping or doffing of the eyelets from the pins 6 after the completion of the molding operation. As will be obvious, by separating the plates so as to withdraw the pins 6 through the plate 7 the latter plate will operate to slide the eyelets off the ends of the pins.

I claim as my invention—

1. The combination with the mold-plate 7, having a series of molds or dies, and also having a series of pins 6 at the centers of the said molds or dies, of a plate 12 having a series of holes registering with said molds and pins, a series of hollow punches which coact with the said holes and pins 6, whereby to form a series of washers and simultaneously therewith assemble them in connection with the said molds or dies in readiness for the molding operation, and a second mold-plate 30 having eyelet-holes 31 and constructed to coöperate with the mold-plate 7 in effecting the molding after the washers have been assembled upon the plate, as described.

2. The combination with the mold-plate 7 having a series of molds or dies, and also having a series of pins 6 at the centers of the said molds or dies, of the heater-plate 28 having holes therein to receive the projecting ends of the said pins, whereby to soften the washers of plastic material on said pins prior to effecting the molding operation, and the mold-plate 30 having eyelet-holes 31 and adapted to coöperate with the mold-plate 7 in effecting the molding after the washers have been softened by the application of the heater-plate, as described.

3. The combination with a mold-plate constructed to receive the plastic material which is to be molded, of a removable heater-plate for application to the plastic material on the said mold-plate, and a second mold-plate whereby to effect the molding after the removal of the said heater-plate, as described.

4. The combination with the mold-plate 7 having a series of molds or dies, of punching devices operating to form a series of washers and simultaneously therewith assemble them in connection with the said molds or dies in readiness for the molding operation, and a second mold-plate 30 having holes 31 and coöperating with the mold-plate 7 in effecting the molding after the washers have been assembled in connection with the latter, substantially as described.

In testimony whereof I affix my signature in presence of two witnesses.

ALANSON C. ESTABROOK.

Witnesses:
  JOHN MANNING,
  W. HOUGHTON.